Nov. 1, 1932.　　　W. V. D. KELLEY　　　1,885,450
COLOR PHOTOGRAPHY
Filed May 7, 1930

"Film a" - Diapositive.

"Film b" - Negative.

"Film c."

"Film d."

"Film e."

"Film f."

Subject.

Inventor;
William V. D. Kelley.
per Arthur J. Farnsworth
Attorney.

Patented Nov. 1, 1932

1,885,450

UNITED STATES PATENT OFFICE

WILLIAM V. D. KELLEY, OF HOLLYWOOD, CALIFORNIA, ASSIGNOR OF ONE-HALF TO G. ALLAN HANCOCK, OF LOS ANGELES, CALIFORNIA

COLOR-PHOTOGRAPHY

Application filed May 7, 1930. Serial No. 450,595.

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

This invention relates to color-photography, and its principal object is to provide an improved method for toning or tinting motion picture films selectively as to the exposed areas, in such a manner that the colored film may be used for projecting a picture of the subject in substantially its natural colors. Other objects will appear below.

By my improved process, it is possible to produce; a succession of toned or dyed images in complementary colors, alternating with respect to each other; or an alternating succession of images tinted in colors that are partially but not wholly complementary. Obviously a process that is capable of producing these results may be used to obtain very delicate color shadings, by which the coloring of the subject photographed may be closely reproduced upon a screen, by virtue of the well-known effect of persistance of vision.

The process may also be used with double-sided films having an emulsion on each side of a base, on which registering images have been made, the images on one side being given a different color from those on the opposite side.

The accompanying drawing illustrates diagrammatically the manner in which my objects are attained, and the steps by which my process is accomplished. In this drawing—

Figure 1 conventionally represents a colored moving subject, of which it is desired to obtain a correspondingly colored motion picture.

Figure 2 conventionally illustrates the result of the first special step of my improved process for obtaining a colored motion picture of the subject. This is the securing of a printing positive film, or "diapositve film", of the subject in black and white, alternate frames of this film showing only the red color values of the subject, and the intermediate frames showing only the blue-green values. This will be referred to hereafter as film "$a$".

Figure 2:
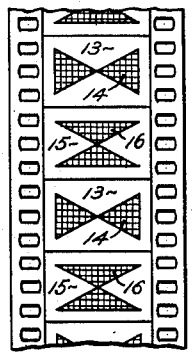

It will be understood that in the specific process selected for describing my invention, films $a$ and $b$ are separate films; and that films $c$, $d$, $e$ and $f$ are the same "film $b$" at the completion of the several stages that it undergoes in treatment. Thus "film $b$" may be regarded as the raw film, and "film $f$" as the finished product.

The surface shading in all the figures is intended to represent color, or black, as the case may be, according to the conventional practice. Similar reference numerals refer to similar parts throughout the several figures, except when such parts have been treated and have thus become of different character. In the latter case the same areas may be referred to by different reference numerals.

Let us first consider the application of the process for coloring a single coated motion picture film, where it is desired to color the picture areas of successive frames differently, in more or less complementary colors. The alternating frames of the pictures of such a film may be assumed to be made from color-selection negatives produced, for example, by exposing behind a pair of rotating color filters, so that every other frame represents the red values, and the intermediate frames the blue-green values.

Figure 1:
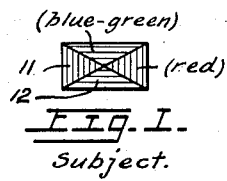

Let us assume that in the subject that is conventionally represented in Fig. 1, the areas 11 are red and the areas 12 are blue-green. My process requires, as the first special step, the securing of a black and white printing positive, or "diapositive" film of the subject, of the type illustrated in Fig. 2 and called herein "film a". In this film the alternate frames 13 show only the red values of the subject at 14; and the intermediate frames 15 show only the blue-green values at 16.

Figure 3:
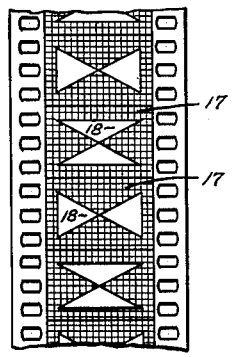
Figure 3 is a black and white negative print made from film $a$, and it will be referred to hereafter as "film $b$".

"Film b", shown in Fig. 3, is a black and white negative film produced, as the second step of the specific process now being described, as by printing from "film a". The exposed areas 17 of this film are developed and fixed in the usual manner.

Figure 4:
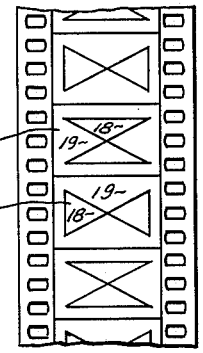
Figure 4 represents "film $b$" after its exposed portions have been bleached to remove the deposited silver, and the corresponding portions of the gelatine emulsion have been tanned or hardened. I will refer to the thus treated film as "film $c$".

The third step in this specific process consists in bleaching and tanning the exposed areas 17 of film b, without altering the character of the gelatine in the unexposed areas 18. This may be accomplished by treating "film b" in a bath composed of potassium ferricyanide 5 g., potassium bromide 7 g., potassium bichromate 8 g., glacial acetic acid 1 c. c., and water 1 liter. This treatment will result in the production of "film c" shown in Fig. 4, wherein areas 19 correspond to areas 17 of film b, but have been bleached and hardened. Unexposed areas 18 have not been affected by the bath, and remain soft. The tanned areas 19 will have no tendency to hold certain types of dyes that may be used for coloring the untanned areas 18. Many acid dyes in concentrated form, or dyes that are listed as "direct dyes", will attach themselves to the soft portions of the gelatine of the film, without staining the hardened tanned portions.

Figure 5:
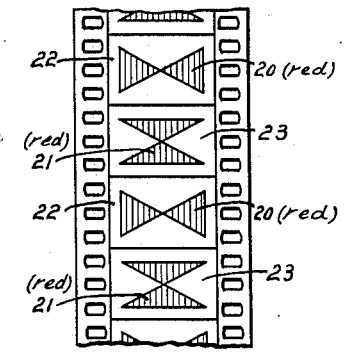
Figure 5 represents "film $c$" after the soft or untanned portions of its gelatine have been dye-toned red. I will call this "film $d$".

The fourth step in the process I am describing is to treat "film c" in a bath containing such dyes as those known in the art as "Congo red" or "benzopurpurine" in solution. This will result in coloring all the soft and untanned portions of the gelatine red, and there will be practically no effect upon the hard tanned portions. The film will now appear as in Fig. 5, wherein areas 20 and 21 have become red, and the other areas remain uncolored. We will call this "film d".

Figure 6:
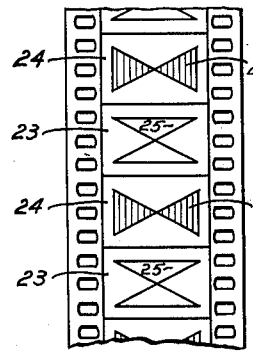
Figure 6 shows "film $d$" after its alternate frames that correspond to the red color values of the subject have been given a transparent water proofing; and after the intermediate frames that correspond to the blue-green color values of the subject have had their red color removed by color-bleaching. The film, after this stage of the treatment, will be referred to as "film $e$".

The fifth step in this process consists in first waterproofing frames 22 of film d, i. e., the frames that correspond to the red color-selective values of the subject. This may be accomplished by means of a suitable transparent varnish, such as celluloid dissolved in acetone or amyl acetate. The other frames 23, i. e. those that correspond to the blue-green color-selective values of the subject, are left unwaterproofed, and are then color-bleached by treating the film in a bath containing 2% of hydrosulphite of soda. This bath will completely remove the red color 21 from frames 23, without affecting the hardened portions of the gelatine in these frames, and it will not have any effect upon waterproofed frames 22. The film will then appear as indicated in Fig. 6, wherein frames 24 are transparently waterproofed so as to protect the underlying color 20, and areas 25 (corresponding to the blue-green values of the subject and to areas 21 of "film d") have become dye-bleached. We will call the film, at this stage of its production, "film e".

The sixth and final step of this specific process is to treat "film e" in a bath containing such a dye as that known to the art as "Acid green GVB", after which it is washed and dried. The dye just mentioned will attach itself to the unprotected soft gelatine areas 25 of "film e", so that they will become blue-green in color as indicated at 26 of Fig. 7, but the dye will not color the hardened gelatine within frames 23.

Figure 7:
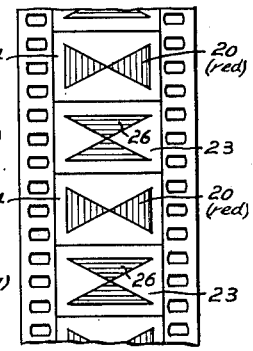
Figure 7 shows "film $e$" after the color-bleached images of the intermediate frames of the latter have been colored blue-green. This is the finished film of the process, and it will be referred to as "film $f$".

The other frames 24, being water proofed, can not be affected by this dye bath. The final result will then be as indicated in Fig. 7, wherein areas 20 are red; and areas 26 are blue-green in color. This film, which we will call "film f", is then washed and dried to complete the process.

The final result of the process that has been described, is the "film f" shown in Fig. 7, this being "film b" after having been subjected to the several steps set forth. It will be observed that the alternate frames 24 carry the red color-values of the subject in red; and that the intermediate frames 23 carry the blue-green color-values of the subject in blue-green. Upon projection this film will show a moving picture of the subject in its full natural colors, provided that the respective dyes have been properly selected for color. The process therefore affords means for obtaining a positive in color from black and white color-selective negatives.

When a doublesided film is to be treated by my process, the silver images of both emulsions are first bleached in a bath containing copper sulphate 90 g., potassium bichromate 30 g., sodium chloride 300 g., and water 4 liters. This will result in tanning the portions of the gelatine in proportion to the reduced silver they contained. The whole film is then subjected to a bath containing such dyes as those known to the trade as "patent blue" or "serichrome blue", in a solution running about 5 grammes to 4000 c.c. of water, which will dye-tone the hard portions of the gelatine. The film is then dried and coated on one side with the waterproof varnish. It is then treated in the bleaching bath of sodium hydrosulphite for about two minutes, which will completely remove the color from the unprotected side of the film. The final step is to treat the film in a bath which will re-tone the unprotected side another and complementary color. This also results in the production of a colored positive from a negative. Other ways of toning are available, and will be apparent to those familiar with this art, in view of the above description.

A variation of the above first-described process, that is within its scope, comprises a means for coloring a film strip that carries color-selective black and white prints, representing red and blue-green values respectively in alternate frames or sections. The whole film, in this case, is first treated and dyed red, in accordance with the above described processes. The alternate frames carrying the red values are then waterproofed. Finally, the unprotected frames are bleached in a bisulphite or hydrosulphite bath, to remove the red coloring, and then dyed in a blue-green bath which can only dye the unprotected portions, the whole process being so similar to that first described that no further explanation of it appears to be necessary.

In the practical use of my first described process, the final film that has its successive frames in alternate colors will be backed by black and white registering prints, made from the corresponding color selection negatives. This may be done by the method described by me in pending application #354,779, filed April 13, 1929; printing through the celluloid base to obtain the black and white print, and on the surface emulsion to obtain the color-selective prints for the purpose first described above.

It is particularly to be noted that my process completely does away with the necessity for treating the film by "floating", so as to affect one side only. It may be completely immersed in all of the baths to which it is to be subjected. Only one operation, that of waterproofing, is confined to one side, and this may be done very quickly by spraying. By the use of suitable spraying apparatus, it is an easy matter to coat alternate frames of the film at the rate of 1000 ft. every twenty minutes.

Contrasting my improved process above described, with similar processes that have hitherto been used, for the purpose of accomplishing the desired results, it is to be noted that my method of removing color by bleaching in a hydrosulphite bath, is greatly superior to washing out the color in a water bath. To accomplish the latter result, if it can be done at all, it is necessary to immerse the film in water for considerable periods of time.

Having thus fully described my invention, I claim:

1. The method of coloring a photographic film which comprises; treating the gelatine of the film in a manner to color it; protecting the portions of the colored gelatine that correspond to similarly colored portions of the subject photographed, by means of a transparent coating that is insoluble in water; removing the color from the unprotected portions of the film in a water bath containing a bleach; and then dyeing said unprotected portions a color that corresponds to other colored portions of said subject.

2. The method of coloring a photographic film which comprises; treating the gelatine of the film in a manner to color it in a way that will not be affected by any of the usual baths employed in photography; protecting the portions of the colored gelatine that correspond to similarly colored portions of the subject photographed, by means of a transparent coating that is insoluble in water; removing the color from the unprotected portions of the film in a water bath containing a bleach; and then dyeing said unprotected portions a color that corresponds to other colored portions of said subject.

3. The method of coloring a motion picture film that has alternate frames carrying complemental color-selective images of a colored subject, which comprises; first, bleaching the reduced silver images of the whole film and dye-toning the image areas one of the color-selective colors; second, protecting the frames that correspond in their color-selective values to the color of said dye-toning with a transparent coating; third, bleaching the color in the unprotected frames in a bath of sodium hydrosulphite; and, finally, re-dye-toning the image areas of said unprotected frames a color that corresponds to their original color selective values.

4. The method of coloring a photographic film that carries complementary color-selective images of a colored subject thereon in reduced silver, which comprises; bleaching said images in a bath adapted to harden the gelatine in proportion to the amount of reduced silver present; subjecting the film to a bath containing a dye adapted to attach to the soft portions of the gelatine only, to give said portions a color that corresponds to one of the complemental colors photographed; protecting the portions of the colored gelatine that correspond to similarly colored portions of the subject, by means of a transparent coating that is insoluble in water;

bleaching the dye in the unprotected portions of the film; and then dyeing said unprotected portions a color that corresponds to the other complemental color photographed.

5. The method of coloring a photographic film which has emulsions on each side of a transparent base, and registering complemental color-selective images in reduced silver in the respective emulsions, which comprises; bleaching said images in a bath that hardens the gelatine in proportion to the amount of reduced silver present; dyeing all the soft portions of the gelatine in one of the complemental colors photographed; protecting the whole of the emulsion that is colored correspondingly to its color-selective exposure; bleaching the dye in the unprotected emulsion; and then dyeing the unprotected emulsion a color that corresponds to its color-selective exposure.

6. The method of coloring a motion picture film which has emulsions on each surface with registering complemental color-selective images respectively thereon, that have been developed and fixed, which comprises; mordanting said images to fix a dye; dyeing said images one of the complemental colors photographed; protecting the images that have thus been colored in a manner that corresponds to their photographed color, by a water-resisting coating; bleaching the unprotected images in a bath that will not affect the mordant; and then mordanting said bleached images a color that correspond to their photographed color.

WILLIAM V. D. KELLEY.